J. SLATTERY.
NUT LOCK.
APPLICATION FILED OCT. 7, 1911.
1,051,770.
Patented Jan. 28, 1913.
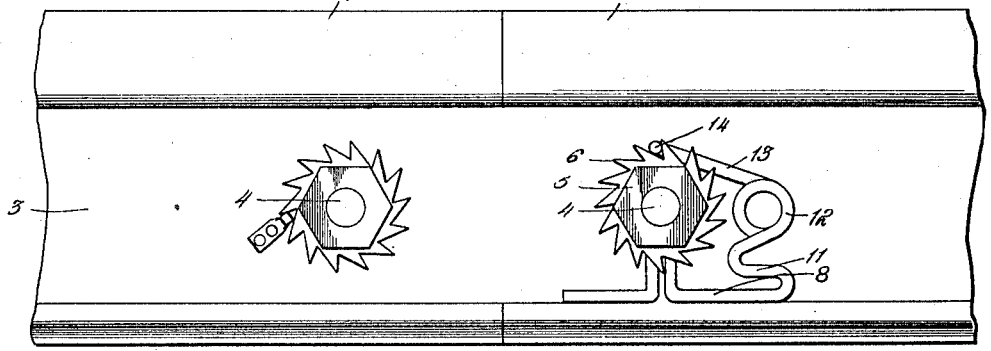
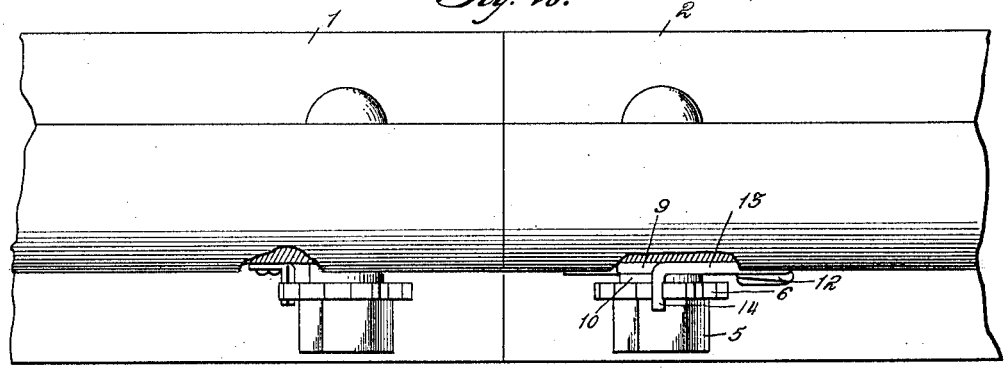
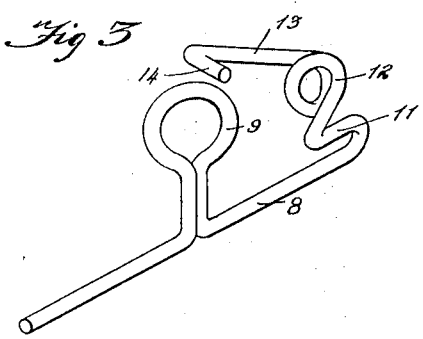
Witnesses
Alan F. Garner
E. Edwouston Jr.
Inventor
John Slattery
By Victor J. Evans
Attorney

UNITED STATES PATENT OFFICE.

JOHN SLATTERY, OF CHROME, NEW JERSEY.

NUT-LOCK.

1,051,770.        Specification of Letters Patent.        Patented Jan. 28, 1913.

Application filed October 7, 1911. Serial No. 653,331.

*To all whom it may concern:*

Be it known that I, JOHN SLATTERY, a citizen of the United States, residing at Chrome, in the county of Middlesex and State of New Jersey, have invented new and useful Improvements in Nut-Locks, of which the following is a specification.

This invention relates to nut locks and more particularly to that type which are used for connection of rail ends.

One of the principal objects of the invention is to provide a simple and efficient device of this character which will effectually lock the nut from unscrewing from the bolt and wherein the nut can be readily tightened at all times and the device disconnected from the nut conveniently for removing the same from the bolt.

Further objects of the invention will appear as the following specific description is read in connection with the accompanying drawing, which forms a part of this application, and in which:—

Figure 1 is a side elevation of the device shown applied to a rail bolt. Fig. 2 is a top plan view. Fig. 3 is a perspective view of the device removed.

Referring more particularly to the drawing, 1 and 2 represent the separate rails to be connected and 3 the fish plate through which the usual bolts 4 pass. Threaded upon the bolt is a nut 5 which is provided with a toothed flange 6.

The locking device consists of a single strand of spring wire 8 which is bent to form a bolt receiving loop 9 which surrounds the bolt and is clamped against the fish plate by the nut, a washer 10 being preferably interposed between the spring and nut to remove the wear from the former. The strand from which the loop 9 is formed preferably lies against the base flange of the rail so as to prevent the loop from turning with the nut, as will be readily understood. This strand, beyond the formation of the loop, is bent back upon itself and formed into a double loop 11 at the end of which a coil 12 is formed and, extending beyond the coil, an arm 13 is produced which terminates in a right angular engaging finger 14 adapted to snap into the spaces between the teeth of the toothed flange 6.

When it is desired to remove the nut from the bolt, the finger 14 is lifted from the toothed flange in any suitable manner.

What is claimed is:—

Means for securing a fish plate to a rail which comprises a bolt, a nut threaded on said bolt and having a ratchet flange and a collar to space the flange from the rail, and a nut lock comprising a single strand of spring wire having a straight portion lying against the base flange of the rail, a bolt encircling loop extending from the straight portion, an extension of the straight portion having a double loop and a spring coil, and an arm forming a continuation of the coil and having a lateral end to engage the ratchet flange, said arm lying between the ratchet flange and rail.

In testimony whereof I affix my signature in presence of two witnesses.

JOHN SLATTERY.

Witnesses:
     PHILIP H. MARTIN,
     JOSEPH C. CHILD.

---

Copies of this patent may be obtained for five cents each, by addressing the "Commissioner of Patents, Washington, D. C."